US010781953B2

(12) United States Patent
Williams

(10) Patent No.: US 10,781,953 B2
(45) Date of Patent: Sep. 22, 2020

(54) AIR-LINE COUPLE

(71) Applicant: Wesley Williams, Gold Canyon, AZ (US)

(72) Inventor: Wesley Williams, Gold Canyon, AZ (US)

(*) Notice: Subject to any disclaimer, the term of this patent is extended or adjusted under 35 U.S.C. 154(b) by 0 days.

(21) Appl. No.: 16/537,785

(22) Filed: Aug. 12, 2019

(65) Prior Publication Data

US 2019/0360622 A1 Nov. 28, 2019

Related U.S. Application Data

(63) Continuation-in-part of application No. 15/479,298, filed on Apr. 5, 2017, now abandoned.

(51) Int. Cl.
| F16L 35/00 | (2006.01) |
| F16L 37/26 | (2006.01) |
| F16L 37/53 | (2006.01) |
| F16L 19/00 | (2006.01) |

(52) U.S. Cl.
CPC ............. *F16L 35/00* (2013.01); *F16L 37/26* (2013.01); *F16L 19/00* (2013.01); *F16L 37/53* (2013.01)

(58) Field of Classification Search
CPC . F16L 35/00; F16L 37/26; F16L 19/00; F16L 37/53
USPC ........................................ 285/67, 70, 71, 72
See application file for complete search history.

(56) References Cited

U.S. PATENT DOCUMENTS

| 410,552 | A | * | 9/1889 | Kennedy, Jr. | |
| 508,448 | A | * | 11/1893 | Terlinden | |
| 653,143 | A | * | 7/1900 | Martin | |
| 1,248,558 | A | * | 12/1917 | Scribner | F16L 37/252 |
| | | | | | 285/70 |
| 1,739,131 | A | * | 12/1929 | Eick | F16L 37/252 |
| | | | | | 285/67 |
| 1,909,058 | A | * | 5/1933 | Horbach | F16L 37/101 |
| | | | | | 285/70 |
| 2,950,130 | A | * | 8/1960 | Schneider | F16L 37/26 |
| | | | | | 285/67 |
| 5,184,851 | A | * | 2/1993 | Sparling | F16L 37/252 |
| | | | | | 285/314 |
| 5,658,159 | A | * | 8/1997 | Gardner | B61G 5/10 |
| | | | | | 439/294 |

* cited by examiner

*Primary Examiner* — James M Hewitt, II
(74) *Attorney, Agent, or Firm* — HPS Law Group LLC; Clark Proffitt

(57) ABSTRACT

An air-line safeguard for use with an air-line connection comprising a first connector and an opposing connector, wherein the first connector comprises a tongue, an interface, and a shaft and wherein the opposing connector comprises an opposing tongue, an opposing interface and an opposing shaft, the safeguard comprising of at least one body that removably attaches to and accommodates the first air-line connector and extends between the shaft and the tongue of the first connector and least partially between the opposing tongue and the opposing shaft of the opposing connector to prevent the first connector from substantially rotating relative to the opposing connector.

6 Claims, 4 Drawing Sheets

AIR-LINE COUPLE

This application is a continuation-in-part of U.S. patent application Ser. No. 15/479,298 filed on Apr. 5, 2017, now abandoned, the complete disclosure of which, in its entirety, is incorporated by reference.

TECHNICAL FIELD

The present invention is a couple. More specifically, the present invention is an air-line couple.

BACKGROUND

Many trailer braking systems are found on utility and commercial trucks adjoining various towing vehicles/containers. These systems typically require a coupling between the cab of a truck and the trailer portion of the truck or towing vehicle. The connectors between the cab portion of an air-line and the trailer portion of an air-line are essentially standard, but the standard connection can come disconnected due to the shaking and vibration inherent with long road trips. Various solutions have been tried to secure air-line connectors, including duct tape, bungee straps, and/or zip ties. These kinds of general safeguards are typically inexpensive but are prone to breaking and snapping due to twists, turns, and the pressure from the air-line.

It would be advantageous to provide an air-line safeguard that is easy to install and provides consumers a way to keep air-lines connected while driving.

SUMMARY

Aspects disclosed herein comprise a couple connector safeguard. More specifically, the present invention is an air-line connector safeguard.

An air-line safeguard for use with an air-line connection comprising a first connector and an opposing connector, wherein the first connector comprises a tongue, an interface, and a shaft and wherein the opposing connector comprises an opposing tongue, an opposing interface and an opposing shaft, the safeguard comprising of at least one body that removably attaches to and accommodates the first air-line connector and extends between the shaft and the tongue of the first connector and least partially between the opposing tongue and the opposing shaft of the opposing connector to prevent the first connector from substantially rotating relative to the opposing connector. The air-line safeguard wherein the at least one body can comprise a first body that accommodates the first connector and an opposing body that accommodates the opposing connector, wherein the first body removably couples to the opposing body.

The first body can comprise at least one leg that extends between the shaft and the tongue of the first connector and the opposing body comprises at least one opposing leg that extends between the opposing tongue and the opposing shaft of the opposing connector. The at least on leg can comprise at least one tab, and the at least one opposing leg comprises at least one slot. The at least one body can comprise at least one leg that extends between the shaft and the tongue of the first connector and accommodates the opposing interface of the opposing connector and a tab portion that extends toward the connector between the opposing tongue and the opposing shaft. The at least one leg can comprise a first leg and a second leg opposite the first leg across the body and wherein the at least one body has a spring force that biases the first leg toward the second leg such that the tab portion secures the safeguard to the first connector and the opposing connector.

It is an object of the present invention to provide a safeguard that provides consumers a way to keep air-lines connectors securely coupled while driving.

It is an object of the present invention to provide a safeguard to connect the service and emergency air-lines from the truck or tractor to the trailer without the use of duct tape, zip ties and binge straps to meet any trucker's need.

It is an object of the present invention to provide a safeguard that is designed to be manufactured with plastic materials for use in any weather condition for optimal durability.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

Figure 1:
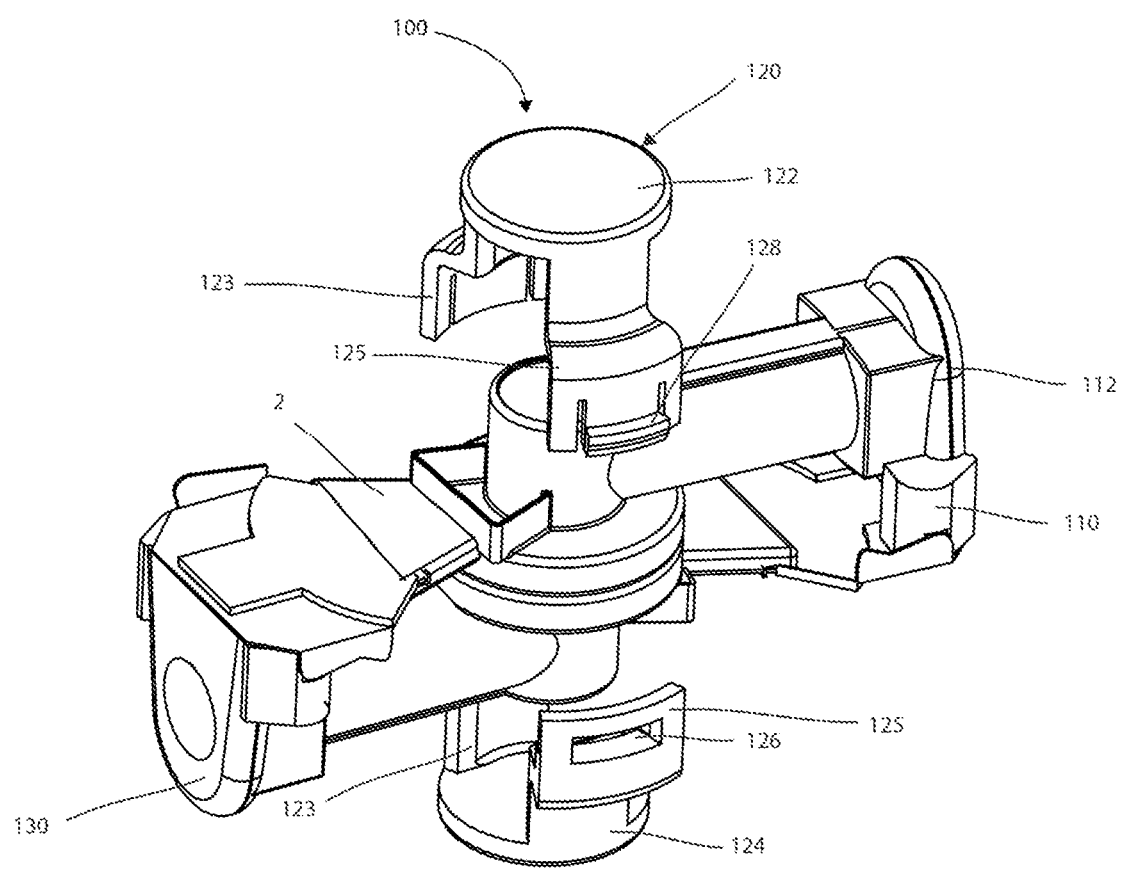
FIG. 1 illustrates an exploded isometric view of a safeguard, in accordance with one embodiment of the present invention.
Figure 2:
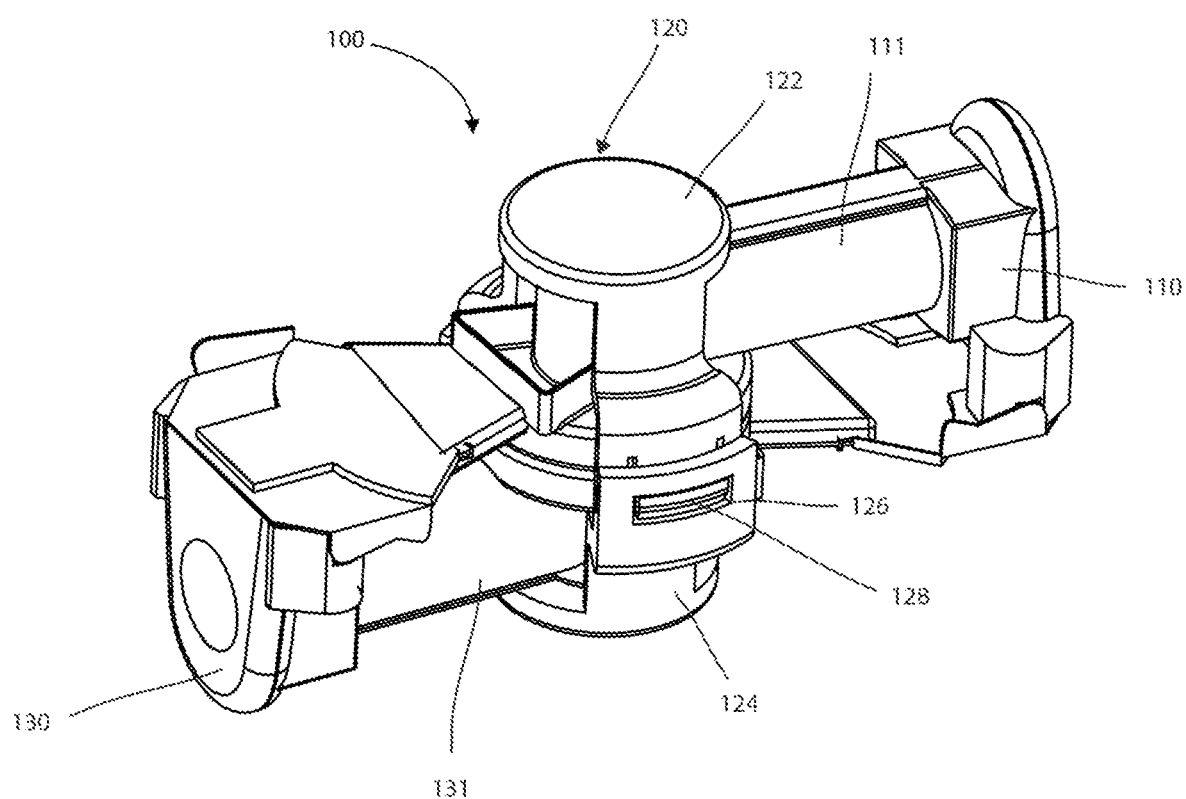
FIG. 2 illustrates an isometric view of a safeguard, in accordance with one embodiment of the present invention.
Figure 3A:
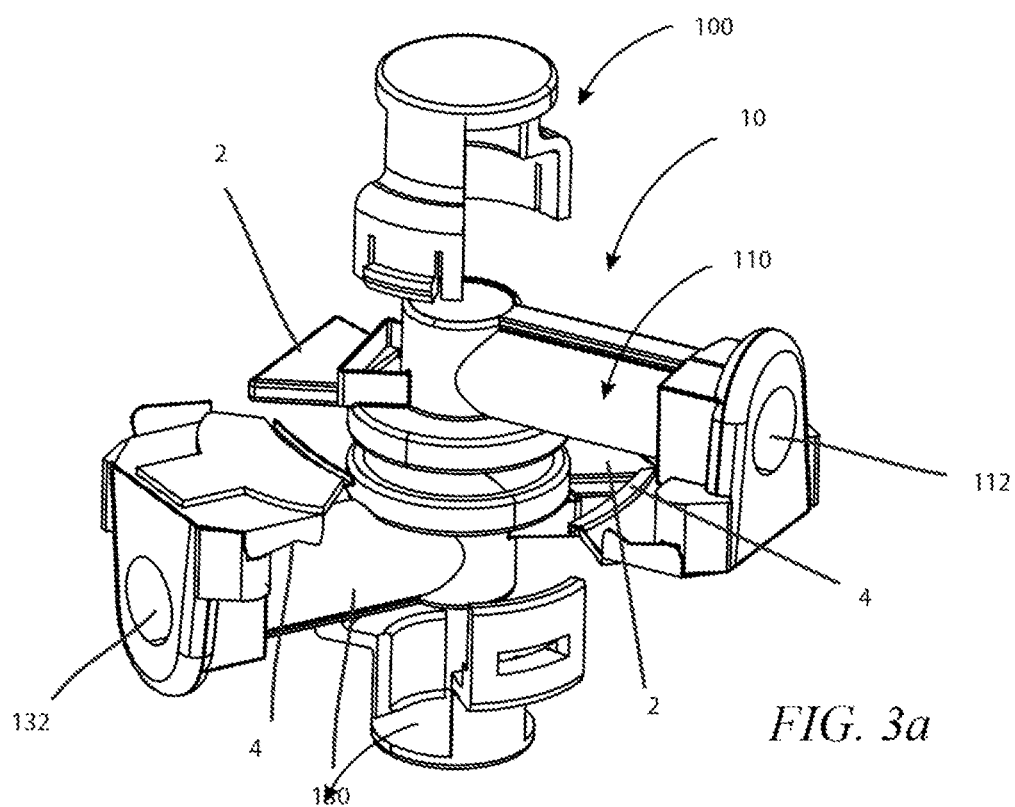
FIG. 3a-3b illustrates an isometric view of a safeguard in its connected and unconnected state, in accordance with one embodiment of the present invention.
Figure 3B:
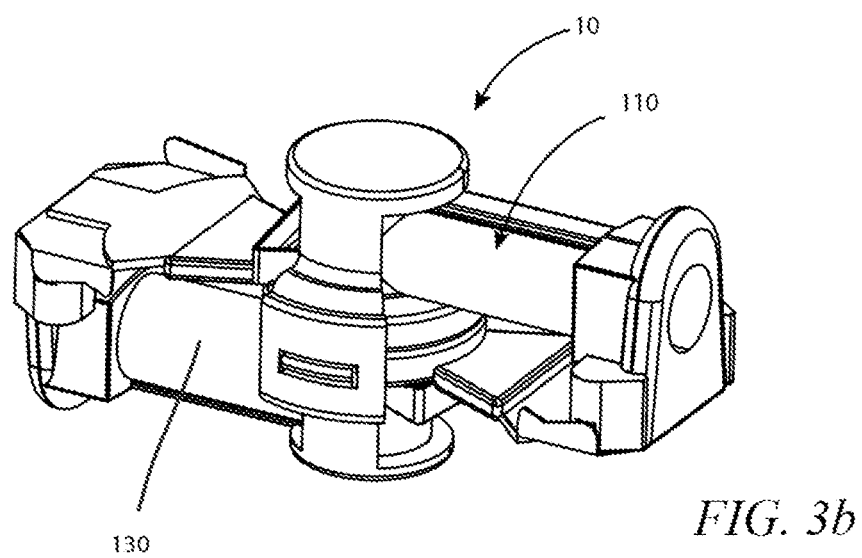

Referring to FIG. 1 and FIG. 2 which illustrates an isometric view of a safeguard 100, in accordance with one or more embodiment, the safeguard 100 is configured to accommodate a first air-line connector 110, and, an opposing air-line connector 130. The first air-line connector 110 may extend forward towards the truck wherein the opposing air-line connector 130 can extend backwards towards the trailer. Referring to FIGS. 3a and 3b, the first connector 110 includes a first air-line receptacle 112 to receive a first air-line, a shaft 111, and an interface 114 that couples to an opposing interface 134 of the opposing connector 130. The opposing connector also includes a second air-line receptacle 132 to receive a second air-line and an opposing shaft 131. The first connector 110 and the opposing connector 130 each includes a groove 4 proximal to the air-line receptacle 112, 132 and a tongue 2 distal to the air-line receptacles 112, 132. The connectors are coupled together by placing the connectors atop each other rotated askew as shown in FIG. 3a. The tongue 2 of each connector is aligned to fit into the groove 4 of the other connector when one connector is rotated relative to the other, as shown in FIG. 3b. During operation of the vehicle, the motion and vibration of the vehicle can cause one connector to rotate relative to the other connector such that the connectors can become uncoupled.

The safeguard 100 includes a first body 122 and an opposing body 124. The first body 122 accommodates a portion of the first air-line connector 110 and includes a first leg 123 and a second leg 125 extending from the first body 122 between the shaft 111 and the tongue 2 of the first air-line connector 110. The opposing body 124 accommodates a portion of the opposing air-line connector 130 and it also includes a first leg 123 and a second leg 125, extending between the air-shaft 131 and the tongue 2 of the second air-line connector 130. The first body 12 can be removably connected to the second body 124 wherein when connected together form a coupled safeguard 120. The first body 122 and the opposing body 124 can have the same shape or different shapes and can be substantially circular in shape, or can be square, rectangular, or the shape of the air-line connectors. The first body 122 can accommodate the first air-line connector 110 or the second air-line connector 130 at their attachment point wherein the opposing body 124 can accommodate the opposite air-line connector clamping the first air-line connector to the second air-line connector. At least one leg 123, 125 of the first body 122 can have at least one tab 128, and at least one leg 123, 125 of the opposing body 124 can have at least one slot 126, or in other embodiments the first body can have at least one slot 126, and the opposing body 124 can have at least one tab 128. The first body 122 can be secured to the opposing body 124 by any other manner known to those having skill in the art.

Rotation of the first connector 110 relative to the opposing connector 130 causes the shaft 111 to push against the first leg 123 and the tongue 2 of the first connector pushes against the second leg 125 of the first body 122. When the at least one leg 123, 125 is coupled to the at least one leg 123, 125 of the opposing body 124, rotation of the first connector relative to the opposing connector 130 is prevented by the first leg 123 of the opposing body 124 being blocked by the shaft 131 of the opposing connector 130 and the second leg 125 of the opposing body being blocked from rotating by the tongue 2 of the opposing connector 130.

FIG. 3a-3b illustrates an isometric view of a safeguard 100 and air-line connector in its unconnected and connected state, in accordance with one or more embodiments. In the air-line connector's unconnected state the air between the first air-line connector 110 and the second air-line connector 130 cannot flow from the truck to the trailer. To complete the connection the first air-line connector 110 rotates onto the second air-line connector 130 and the safeguard 100 encompasses a portion of the first air-line connector 110 and a portion of the second air-line connector 130 and acts as an anti-rotation device that stops the first air-line connector 110 from rotating off and becoming unconnected from the second air-line connector 130.

Figure 4:
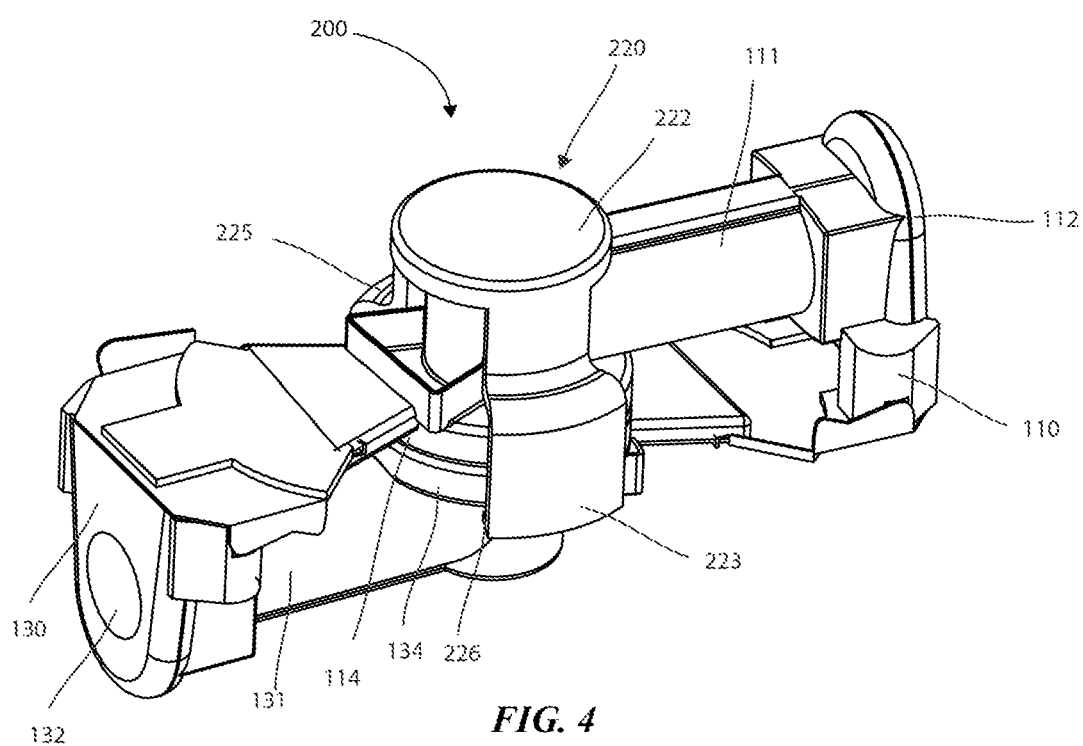
FIG. 4 illustrates an isometric view of another embodiment of a safeguard, in accordance with one embodiment of the present invention.

FIG. 4 illustrates an isometric view of another embodiment of a safeguard 200, in accordance with one or more embodiments. The first air-line connector 110 and the second air-line connector 130 can be encapsulated or encompassed by an at least one body 222 wherein the air-line couple can have a first leg 223 and a second leg 225 wherein the first leg 223 and the second leg 225 can extend between the air-line receptacle 112 and the tongue 2 of the first air-line connector 110 past the interface 114 of the first connector 110 and the opposing interface 134 of the opposing air-line connector 130. The first leg 223 can have at least one tab 226. In particular embodiments, and the second leg 225 can also have at least one tab 228. Spring force of the body 222 holds the tab 226 at least partially between the tongue 2 and the opposing shaft 131 of the opposing air-line connector 130. Rotating the first air-line connector 110 relative to the opposing air-line connector 130 pushes the shaft 111 of the first air-line connector 110 against the first leg 223 of the safeguard 220. Rotation is prevented by the tab 226 being blocked from rotating by the opposing shaft 131 keeping the two connectors from rotating and separating.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

In closing, it is to be understood that although aspects of the present specification are highlighted by referring to specific embodiments, one skilled 55 in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. An air-line safeguard for use with an air-line connection comprising a first connector and an opposing connector, wherein the first connector comprises an interface, a tongue extending radially from the axis of the interface, and a shaft and wherein the opposing connector comprises an opposing tongue, an opposing interface and an opposing shaft, the safeguard comprising:

at least one body that removably attaches to and accommodates the first air-line connector and extends between the shaft and the tongue of the first connector and least partially between the opposing tongue and the opposing shaft of the opposing connector to prevent the first connector from substantially rotating relative to the opposing connector.

2. The air-line safeguard according to claim 1, wherein the at least one body comprises a first body that accommodates the first connector and an opposing body that accommodates the opposing connector, wherein the first body removably couples to the opposing body.

3. The air-line safeguard according to claim 2, wherein the first body comprises at least one leg that extends between the shaft and the tongue of the first connector and the opposing body comprises at least one opposing leg that extends between the opposing tongue and the opposing shaft of the opposing connector.

4. The air-line safeguard according to claim 3, wherein the at least one leg comprises at least one tab, and the at least one opposing leg comprises at least one slot.

5. The air-line safeguard of claim 1, wherein the at least one body comprises at least one leg that extends between the shaft and the tongue of the first connector and accommodates the opposing interface of the opposing connector and a tab portion that extends toward the connector between the opposing tongue and the opposing shaft.

6. The air-line safeguard of claim 5, wherein the at least one leg comprises a first leg and a second leg opposite the first leg across the body and wherein the at least one body has a spring force that biases the first leg toward the second leg such that the tab portion secures the safeguard to the first connector and the opposing connector.

\* \* \* \* \*